Jan. 10, 1928.

A. C. JOYAL 1,656,118

NUT AND BOLT LOCK

Filed Dec. 8, 1926

Aurelius C. Joyal, Inventor

Witnesses

By Richard B. Owen

Attorney

Patented Jan. 10, 1928.

1,656,118

UNITED STATES PATENT OFFICE.

AURELIUS C. JOYAL, OF ST. NORBERT, MANITOBA, CANADA.

NUT AND BOLT LOCK.

Application filed December 8, 1926. Serial No. 153,402.

This invention relates to a nut and bolt lock and has for its primary object the provision, in a manner as hereinafter set forth, of a nut and bolt lock structure of a design adapted to be easily and quickly placed in position, strong and durable, and efficient.

The invention contemplates the provision of a bolt having a short portion of the free end thereof of less diameter than the body of the shank and provided with left hand threads. A nut adapted to be threaded upon the bolt shank and provided with the surrounding lateral extending flange at the outer end thereof which flange has its under face provided with ratchet teeth. An outer nut is designed to be threaded upon the adjacent portion of the shank and has a part thereof of the same diameter as the surrounding lateral extension upon the nut and further provided with screw threads. This outer nut also has a pin projecting from the inner edge of the threaded portion thereof, which pin is designed to engage in a notch formed in the outer edge of a sleeve body which is carried upon the nut and which has teeth formed upon the inner side to coact with the teeth upon the nut. This sleeve body is also provided with interior threads to receive the threaded portion of the outer nut and the thread connection between the sleeves are so related that the pin carried by the outer nut will be brought into position to engage a notch in the outer edge of the sleeve when the elements are assembled.

The invention will be best understood from a consideration of the following detailed description taken in connection with the accompanying drawing, forming a part of this specification, with the understanding, however, that the invention is not confined to any strict conformity with the drawings, but may be changed or modified so long as such changes or modifications mark no material departure from the salient features of the invention, as expressed in the appended claims.

Figure 1:
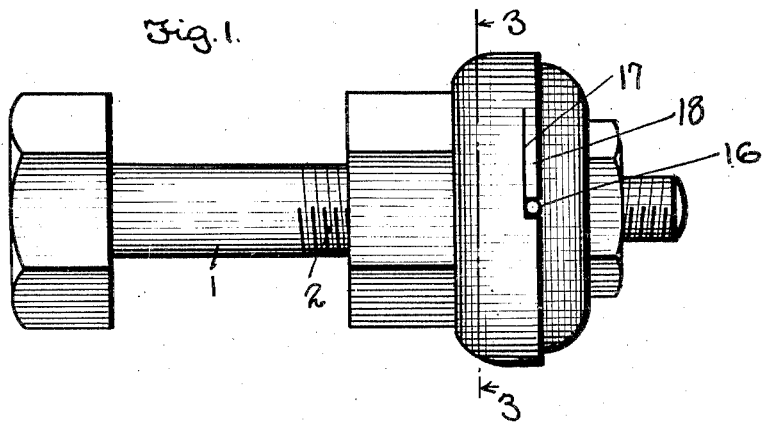
Figure 1 shows a nut and bolt structure of the type embodying this invention in side elevation.

Referring now to the drawings in detail wherein like numerals of reference are used to indicate corresponding parts throughout the several views, the numeral 1 indicates the shank of a bolt, having the right hand threads thereon as indicated at 2, the shank 1 having the free outer end thereof formed to provide longitudinally extending reduced portion 3 which is provided with left hand threads 4.

Figure 4:
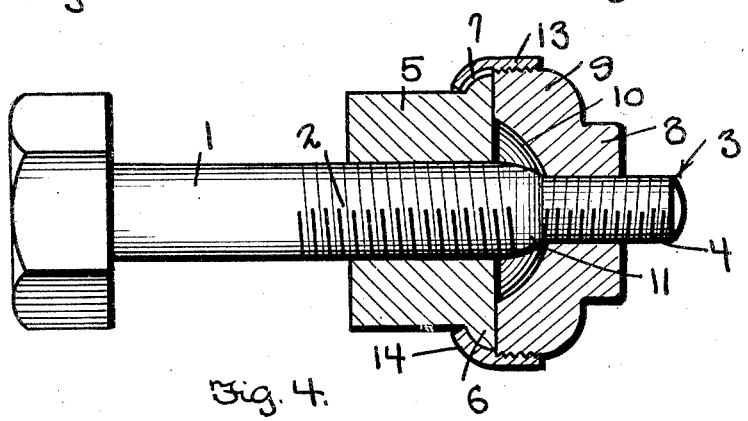
Figure 4 is a longitudinal section of the associated nut showing the bolt upon which they are mounted in elevation.

Adapted to be threaded upon the threads 2 of the shank 1 is the nut 5 which is of the usual hexagonal design, and formed about this nut flush with the outer end thereof is the laterally extending surrounding flange 6, the inner surface of which is convexly curved as shown in Figure 4, and provided with the ratchet teeth formed transversely, as indicated by the numeral 7.

Designed to be threaded upon the reduced portion 3 of the bolt is an outer nut 8 having the enlarged circular portion 9 formed integral therewith, which portion 9 is of the same diameter as the flange 6, and is provided with surrounding screw threads. This portion 9 is also provided with the central cavity 10 designed to enable the nut to be threaded down over the holder 11 which is formed between the shank 1 and the reduced portion 3. This enlarged circular portion 9 of the nut 8 also has projecting laterally therefrom a pin 12, which is arranged adjacent the inner end of the flange formed on the enlarged portion.

Designed to surround the enlarged portion 9 of the nut 8 is a sleeve body 13 which is provided with interior threads to engage the threads upon the portion 9 and one end of this sleeve is constricted and of substantially arcuate cross section as indicated at 14 to conform to the curved under side of the flange 6. The inner face of the constricted portion of the sleeve 13 is provided with the transverse teeth 15 which are designed to engage ratchet teeth 7 upon the flange 6.

Figure 2:
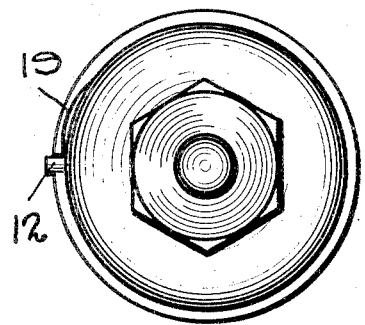
Figure 2 is an end elevation looking at the reduced end of the bolt with the nut thereon.
Figure 3:
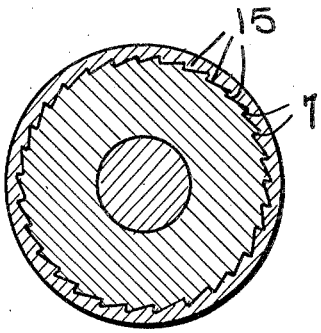
Figure 3 is a transverse section taken upon the line 3—3 of Figure 1.

The outer edge of the sleeve 13 has a square notch 16 cut thereinto and a slot 17 is formed through the body of the sleeve parallel with the outer edge thereof, for a short distance to set up the spring tongue 18, the free end which forms one side wall of the notch 16 as is shown in Figure 1. The inner face of this spring tongue 18 is recessed as indicated at 19 (see Figure 2) for the insertion of an instrument to spring the tongue outwardly for the purpose described.

In assembling the nut and bolt element embodying this invention, sleeve 13 is first passed over the nut 5 whereupon the nut is then threaded upon the threads 2 of the bolt shank. The outer nut 8 is then threaded upon the reduced portion 3 and the threaded enlarged portion 9 is caused to enter into threaded engagement with the sleeve 13 and threaded completely thereinto until the nut 5 and the outer nut 8 of the enlarged portion thereof are brought into contact. The threads connecting the sleeve 13 with the enlarged portion 9 of the outer nut are of the same size and number as those upon the reduced portion 3 and are so pitched as to bring the pin 12 at the proper moment to the point where the tongue 18 can be sprung outwardly to allow the pin to move into the slot 16. When this locking action takes place between the portion 9 of the outer nut and the sleeve 13, the ratchet teeth 7 and 15 will be in engagement and it will thus be seen that a positive locking connection will be made between these three elements and the bolt shank. If it is desired to release the nuts then an instrument may be inserted in the groove 19 to spring the tongue 18 outwardly and the operation of the parts reversed to disengage them.

Having thus described my invention what I claim is:

1. In a nut and bolt lock of the character described, a bolt member having a portion of the outer end of the shank thereof reduced and provided with screw threads, and further having screw threads formed upon the shank proper, an inner nut adapted to be threaded upon said shank, a laterally extending flange surrounding the outer end of said inner nut, ratchet teeth formed on the under face of said flange, an outer nut adapted to be threaded upon said reduced portion and having an enlarged portion designed to engage said flange, a surrounding securing sleeve upon said inner nut, means whereby said sleeve may engage said ratchet teeth, and means for setting up engagement between said enlarged portion of said outer nut and the outer end of said sleeve, to lock said nuts together.

2. In a nut and bolt lock, a bolt member having the free outer end of the shank thereof of reduced size and provided with screw threads and further having screw threads formed upon the shank proper, an inner nut adapted to be threaded upon said shank, an outer nut designed to be threaded upon said reduced portion and bear against the outer end of said inner nut, a pin member projecting laterally from said outer nut, a sleeve member surrounding said inner nut, means to prevent said sleeve member from passing the outer end of said inner nut, and means to set up an engagement between the outer end of said sleeve member and said pin.

3. In a nut and bolt lock of the character set forth, a bolt member having the free outer end of the shank thereof of reduced size and provided with screw threads, and further having the shank proper provided with screw threads, an inner nut designed to be secured upon said shank, a surrounding laterally extending flange adjacent the outer end of said inner nut, ratchet teeth formed upon the inner side of said flange, an outer nut adapted to be threaded upon the reduced portion of said shank and having an enlarged portion designed to bear against said flange, a laterally projecting pin member carried by said enlarged portion, a sleeve designed to surround a portion of the abutting ends of said nuts, said sleeve having the inside edge thereof provided with means for engaging the teeth on said flange, thread engaging means between the outer portion of said sleeve and the enlarged portion of said nut, and means to provide a locking engagement between the outer edge of said sleeve and said pin.

4. In combination with a bolt having a shank and screw threads formed thereon, an inner nut threaded upon the shank of said bolt, an outer nut threaded upon said bolt and contacting with said inner nut, a sleeve member surrounding said nuts and having engagement with the abutting ends thereof, and resilient means designed to automatically lock said sleeve in engagement with said outer nut to prevent reverse rotation of the sleeve thereabout.

In testimony whereof I affix my signature.

AURELIUS C. JOYAL